US008508550B1

(12) United States Patent
Jenny

(10) Patent No.: US 8,508,550 B1
(45) Date of Patent: Aug. 13, 2013

(54) SELECTIVE RENDERING OF OBJECTS

(75) Inventor: Josh Jenny, Lafayette, CA (US)

(73) Assignee: PIXAR, Emeryville, CA (US)

( * ) Notice: Subject to any disclaimer, the term of this patent is extended or adjusted under 35 U.S.C. 154(b) by 562 days.

(21) Appl. No.: 12/248,860

(22) Filed: Oct. 9, 2008

Related U.S. Application Data

(60) Provisional application No. 61/060,441, filed on Jun. 10, 2008.

(51) Int. Cl.
G09G 5/30 (2006.01)
G06T 15/40 (2006.01)
G06T 17/00 (2006.01)
G06T 15/30 (2011.01)
G06T 11/60 (2006.01)
G06T 19/00 (2011.01)

(52) U.S. Cl.
CPC ............... *G06T 11/60* (2013.01); *G06T 15/30* (2013.01); *G06T 19/00* (2013.01)
USPC ........... 345/620; 345/619; 345/419; 345/624

(58) Field of Classification Search
CPC .......... G06T 11/60; G06T 15/30; G06T 19/00
USPC .................................. 345/620, 619, 419, 624
See application file for complete search history.

(56) References Cited

U.S. PATENT DOCUMENTS

| | | | | |
|---|---|---|---|---|
| 4,925,294 A | * | 5/1990 | Geshwind et al. | 352/57 |
| 5,805,733 A | * | 9/1998 | Wang et al. | 382/232 |
| 5,929,859 A | * | 7/1999 | Meijers | 345/419 |
| 6,031,538 A | * | 2/2000 | Chupeau et al. | 345/419 |
| 6,320,580 B1 | * | 11/2001 | Yasui et al. | 345/421 |
| 6,441,816 B1 | * | 8/2002 | Nguyen et al. | 345/420 |
| 6,611,268 B1 | * | 8/2003 | Szeliski et al. | 345/473 |
| 6,618,048 B1 | * | 9/2003 | Leather | 345/422 |
| 6,674,484 B1 | * | 1/2004 | Boland et al. | 348/580 |
| 6,919,907 B2 | * | 7/2005 | Berstis | 345/619 |
| 7,003,136 B1 | * | 2/2006 | Harville | 382/103 |
| 7,027,054 B1 | * | 4/2006 | Cheiky et al. | 345/473 |
| 7,557,824 B2 | * | 7/2009 | Holliman | 348/46 |
| 7,633,511 B2 | * | 12/2009 | Shum et al. | 345/628 |
| 7,643,025 B2 | * | 1/2010 | Lange | 345/419 |
| 7,652,665 B2 | * | 1/2010 | Fukushima et al. | 345/419 |

(Continued)

FOREIGN PATENT DOCUMENTS

EP 1 353 518 A1 * 10/2003

OTHER PUBLICATIONS

Disparity field and depth map coding for multiview 3D image generation .by D Tzovaras—1998.*

(Continued)

*Primary Examiner* — Javid A Amini
(74) *Attorney, Agent, or Firm* — Kilpatrick Townsend & Stockton LLP

(57) ABSTRACT

An animation scene including a group of objects is rendered by dividing the group into multiple clipping regions based on object location. The objects are sorted based on the depth extent of each object relative to a camera position. The objects are then assigned to a clipping region such that each clipping region includes about the same number of objects. Each clipping region is then rendered independently and in parallel to reduce processor and memory load.

25 Claims, 3 Drawing Sheets

(56) References Cited

U.S. PATENT DOCUMENTS

| | | | |
|---|---|---|---|
| 7,782,317 B2 * | 8/2010 | Middler | 345/421 |
| 7,796,132 B1 * | 9/2010 | Nakagawa | 345/426 |
| 7,808,512 B1 * | 10/2010 | Hutchins et al. | 345/620 |
| 7,839,402 B2 * | 11/2010 | Dekel et al. | 345/421 |
| 7,889,194 B2 * | 2/2011 | Engel et al. | 345/419 |
| 2002/0032697 A1 * | 3/2002 | French et al. | 707/500.1 |
| 2004/0095357 A1 * | 5/2004 | Oh et al. | 345/589 |
| 2004/0150638 A1 * | 8/2004 | Ikeuchi et al. | 345/419 |
| 2004/0257375 A1 * | 12/2004 | Cowperthwaite | 345/582 |
| 2005/0053276 A1 * | 3/2005 | Curti et al. | 382/154 |
| 2005/0129316 A1 * | 6/2005 | Curti et al. | 382/224 |
| 2006/0077208 A1 * | 4/2006 | Aoki | 345/582 |
| 2006/0098282 A1 * | 5/2006 | McCart et al. | 359/472 |
| 2007/0103465 A1 * | 5/2007 | Barenbrug et al. | 345/426 |
| 2007/0176929 A1 * | 8/2007 | Grabli et al. | 345/427 |
| 2008/0058593 A1 * | 3/2008 | Gu et al. | 600/109 |
| 2008/0095435 A1 * | 4/2008 | Lipton et al. | 382/173 |
| 2008/0117212 A1 * | 5/2008 | Woo et al. | 345/427 |
| 2008/0226194 A1 * | 9/2008 | Birtwistle et al. | 382/285 |
| 2008/0252661 A1 * | 10/2008 | Hilton | 345/649 |
| 2008/0267527 A1 * | 10/2008 | Berretty | 382/276 |
| 2009/0215533 A1 * | 8/2009 | Zalewski et al. | 463/32 |
| 2009/0262184 A1 * | 10/2009 | Engle et al. | 348/47 |
| 2010/0008568 A1 * | 1/2010 | Curti et al. | 382/164 |
| 2010/0289797 A1 * | 11/2010 | Tateno et al. | 345/419 |
| 2011/0069152 A1 * | 3/2011 | Wang et al. | 348/43 |
| 2011/0090318 A1 * | 4/2011 | Chen et al. | 348/50 |
| 2011/0141237 A1 * | 6/2011 | Cheng et al. | 348/46 |
| 2011/0261050 A1 * | 10/2011 | Smolic et al. | 345/419 |

OTHER PUBLICATIONS

"3D effect generation from monocular view" Curti, S.; Sirtori, D.; Vella, F. 3D Data Processing Visualization and Transmission, 2002. Proceedings. First International Symposium on Digital Object Identifier: 10.1109/TDPVT.2002.1024116 Publication Year: 2002, pp. 550-553.*

Milliron, Tim et al., "Smart Cars: Driving the Characters in *Cars*," 2006, *Siggraph*, 1 page.

U.S. Appl. No. 11/759,790, filed Jun. 7, 2009, 48 pages.

* cited by examiner

SELECTIVE RENDERING OF OBJECTS

CROSS REFERENCE TO RELATED APPLICATION

This application claims priority to U.S. Provisional Patent Application No. 61/060,441 filed on Jun. 10, 2008, herein incorporated by reference in its entirety for all purposes.

TECHNICAL FIELD

The present invention relates to computer animation graphics and, more particularly, to a method for selectively rendering objects in an animation scene.

BACKGROUND

The production of animated features involves the use of computer graphics techniques to produce a visually appealing image that can be used to convey an element of a story. One of the challenges in rendering images for use in animated features is balancing the desire for a visually appealing image of a character or object with the practical issues involved in allocating the computational resources required to produce the image in a feature film environment. Further, although the image need not be fully realistic in all cases, it is desirable that the artist producing the image be able to modify certain attributes of the rendered image, typically by adjusting input parameters of the graphics software, to obtain a visually appealing image that suits the purposes of the story line.

In computer animation graphics, a rendering program renders an image by producing pixels from a scene description. Scene description input files contain a three dimensional geometric description of all objects in the scene, as well as a virtual-camera description and light descriptions. In a simple rendering process, an element in the scene or image is modeled and then the software models how that element appears to a viewer (at a specified location and viewing angle) when light (typically multiple light sources) illuminates the element or causes the element to be shaded.

When rendering a very large group of objects in an animation scene, processing becomes complicated due to a strain on computational resources. For example, a crowd of tens of thousands of characters generates complex geometry for the renderer to process. An animator may separate the objects into different render layers that may each be rendered separately. However, the process of manually dividing the scene into separate render layers increases the amount of time necessary for the animator to generate a scene. The rendering process is further complicated when the objects or a camera position are moving in the scene. Rendering a dynamic scene requires additional user input for each frame to identify which objects may be rendered as one layer, thereby further increasing processing time and memory overload.

Therefore, what is needed is a method for rendering a group of objects in an animation scene that provides an efficient use of computational resources.

SUMMARY

An animation scene including a group of objects is rendered by dividing the group into multiple clipping regions based on object location. The objects are sorted based on the depth extent of each object relative to a camera position in the scene. The objects are then assigned to a clipping region such that each clipping region includes about the same number of objects. Each clipping region is then rendered independently and in parallel to reduce processor and memory load.

In some embodiments, the present invention is directed to a method for rendering objects. The method includes receiving a description of a scene. The description includes a location of each object in the scene and a camera position. A depth extent of each object is determined relative to the camera position. The determined depth extents are analyzed to generate clipping regions. An image is then rendered for each clipping region.

In other embodiments, the present invention is directed to a method for rendering objects in an animation scene. A value is received for a number of clipping regions associated with the animation scene. A depth extent of each of a plurality of objects in the animation scene relative to a camera position is analyzed to generate the clipping regions. Each of the plurality of objects is assigned to one of the clipping regions based on the depth extent of each object. A layer to be rendered is then created for each clipping region.

In still other embodiments, the present invention is directed to a method for rendering objects in an animation scene. A depth extent of each of a plurality of objects in an animation scene is identified relative to a camera position. The depth extent of each of the plurality of objects in the animation scene is analyzed to generate a plurality of clipping regions. Each of the plurality of objects is assigned to one of the plurality of clipping regions based on the identified depth extent of each of the plurality of objects. An image is then rendered for each clipping region.

These and other advantages of the invention will be apparent to those of ordinary skill in the art by reference to the following detailed description and the accompanying drawings.

DETAILED DESCRIPTION

An animation scene including a group of objects is rendered by dividing the group into multiple clipping regions based on object location. The objects are sorted based on a depth extent of each object relative to a camera position. The objects are then assigned to a clipping region such that each clipping region includes about the same number of objects. Each clipping region is then rendered independently and in parallel to reduce processor and memory load.

Figure 1:
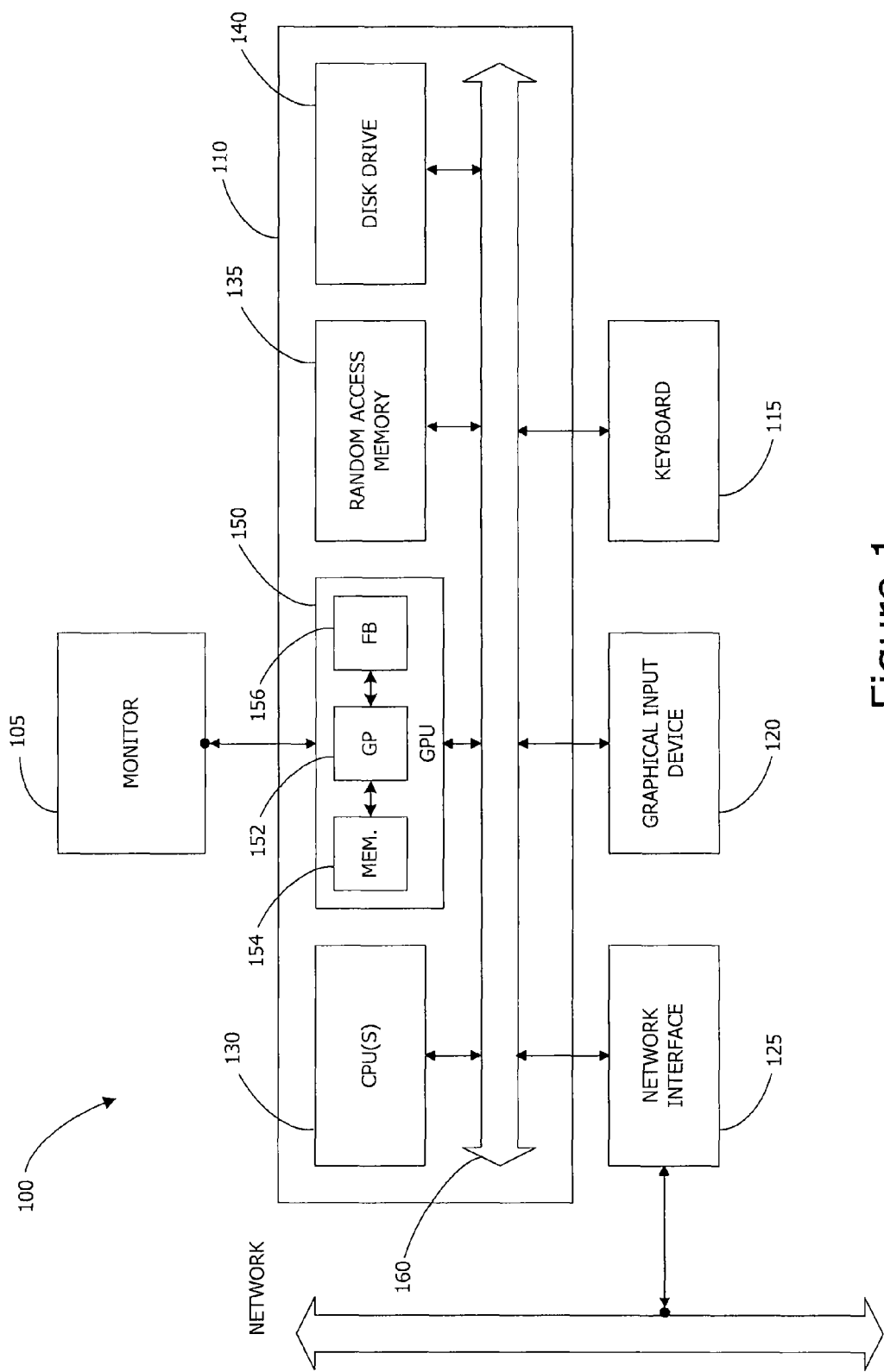
FIG. 1 is a block diagram of a computer system that may be used to practice embodiments of the present invention.

FIG. 1 is a block diagram of a computer system that may be used to practice embodiments of the present invention. FIG. 1 is merely illustrative of an embodiment incorporating the present invention and does not limit the scope of the invention as recited in the claims. One of ordinary skill in the art would recognize other variations, modifications, and alternatives.

In one embodiment, computer system 100 typically includes a monitor 105, computer 110, a keyboard 115, a user input device 120, computer interfaces 125, and the like.

In various embodiments, user input device 120 is typically embodied as a computer mouse, a trackball, a track pad, a joystick, wireless remote, drawing tablet, voice command system, eye tracking system, and the like. User input device 120 typically allows a user to select objects, icons, text and the like that appear on the monitor 105 via a command such as a click of a button or the like.

Embodiments of computer interfaces 125 typically include an Ethernet card, a modem (telephone, satellite, cable, ISDN), (asynchronous) digital subscriber line (DSL) unit, FireWire interface, USB interface, and the like. For example, computer interfaces 125 may be coupled to a computer network, to a FireWire bus, or the like. In other embodiments, computer interfaces 125 may be physically integrated on the motherboard of computer 110, and may be a software program, such as soft DSL, or the like.

In various embodiments, computer 110 typically includes familiar computer components such as a processor 130, and memory storage devices, such as a random access memory (RAM) 135, disk drives 140, a GPU 150, and system bus 160 interconnecting the above components.

In some embodiment, computer 110 includes one or more Xeon microprocessors from Intel. Further, one embodiment, computer 110 includes a UNIX-based operating system.

RAM 135 and disk drive 140 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 150 may be any conventional graphics processing unit that may be user programmable. Such GPUs are available from NVIDIA, ATI, and other vendors. In this example, GPU 150 includes a graphics processor 152, a number of memories and/or registers 154, and a number of frame buffers 156.

FIG. 1 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Figure 2:
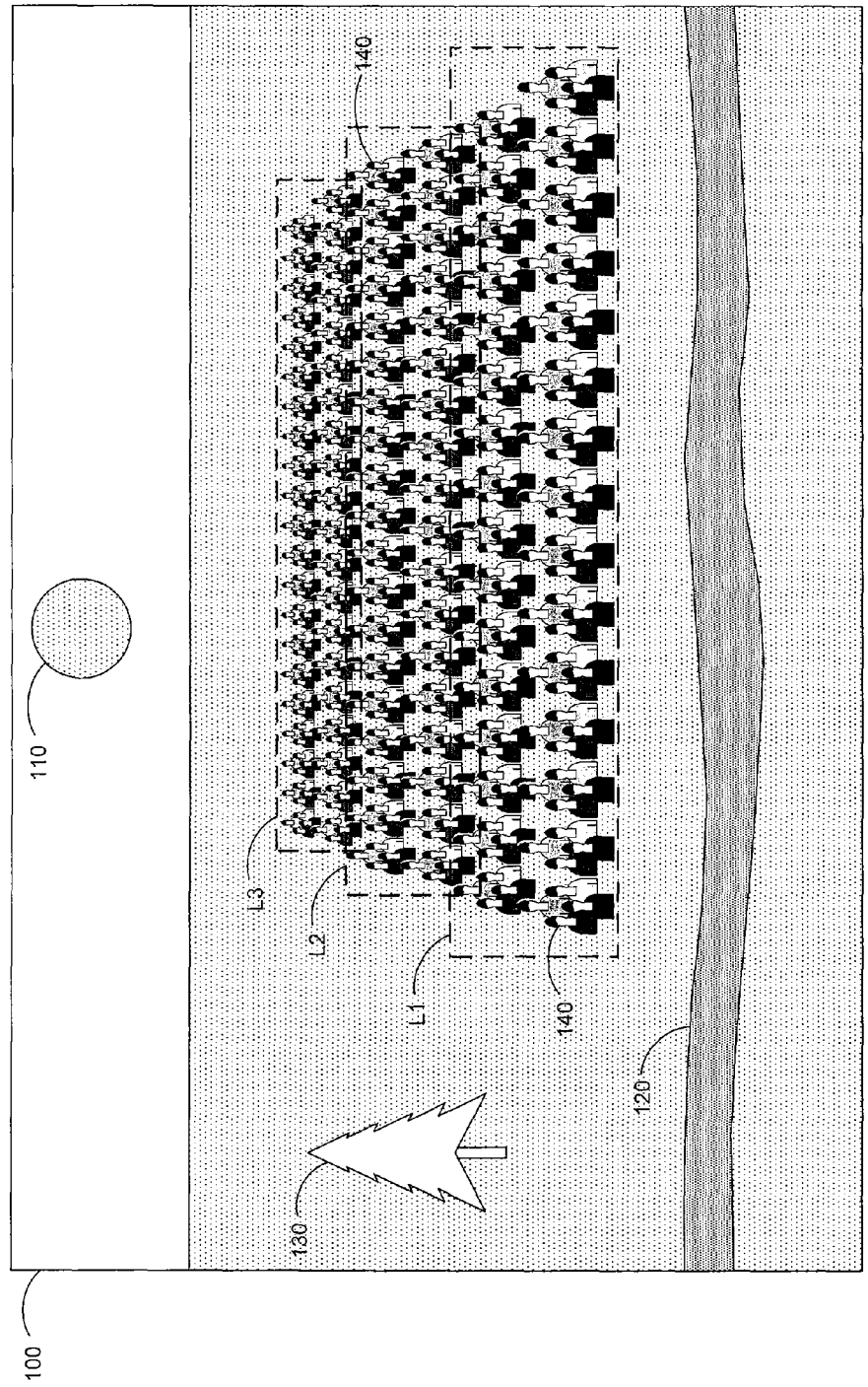
FIG. 2 illustrates an animation scene including a group of objects that is divided into different layers that are rendered independently in accordance with embodiments of the present invention.

FIG. 2 illustrates an animation scene 200 including different objects to be rendered in a frame. Some of the objects, such as objects 210, 220, 230, are standalone objects that are not part of a group. Other objects in the scene, such as objects 240, are part of a collection of objects comprising a group. As shown in the figure, the group of objects 240 is a crowd of people. However, one having ordinary skill in the art would appreciate that the objects 140 may be a part of any large group such as a herd of cattle, an army of insects or a parking lot occupied by many motor vehicles. In accordance with embodiments of the present invention, the group of objects 240 is divided into different clipping regions that are each rendered independently.

Before the scene is rendered, the animator identifies the group of objects 240 as a collection of objects having different portions to be rendered separately in different layers. The animator may select the number of render layers. As shown in the figure, the animator has divided the group of objects 240 into three different clipping regions L1, L2, L3. The clipping regions L1-L3 are rendered independently and then assembled as a composite layer with the remainder of the objects 210, 220, 230 of the scene 200 when the final image is generated, in accordance with embodiments of the present invention.

As one having ordinary skill in the art would appreciate, the animator may select any number of clipping regions to separate the group of objects 240. Generally, the animator selects the number of clipping regions to be as few as possible to conserve computational resources. For example, the animator may set the number of clipping regions to two. If the group of objects cannot be rendered in two layers without using all of the allotted memory, the animator increases the number of clipping regions. The animator may increase the number of clipping regions after the scene is rendered until the group of objects can be rendered without consuming all available memory.

Dividing a scene into different render layers along the z-axis in three dimensional space is commonly referred to as a "z-split". Z-splits provide a way of splitting scenes into several smaller layers that are easier to render. Z-splits are useful when rendering a group that includes a large number of objects that align with a field of view of a camera position along the z-axis in a three-dimensional scene. Conventional use of z-splits requires the user to manually set specific locations for the clipping regions and the number of objects to include in each clipping region, thereby extending the time required for the animator to create the scene. Furthermore, unlike embodiments of the present invention, the conventional use of z-splits is not dependent on the actual configuration of the scene.

As shown in the figure, the scene may be partitioned into clipping regions in the form of two-dimensional clipping planes. However, as one having ordinary skill in the art would appreciate, the clipping regions may take the form of other shapes by which the group of objects is divided based on a depth extent of each object. In other words, the clipping regions can be any shape that partitions space and may be ordered based on depth. The clipping regions need not be axis-aligned. For example, the clipping region may be a three-dimensional clipping volume such as a number of cubes or concentric cylinders. In one embodiment, the group of objects may be assigned to a number of cubes, and then each of the cubes is rendered separately, in accordance with embodiments of the invention.

In accordance with embodiments of the present invention, the location of the clipping regions L1-L3 may change dynamically throughout an animation sequence (as discussed below). For each frame, the clipping regions are defined automatically depending on the camera position and the locations of the objects 240 in the group. After the animator identifies the group of objects 240 to be rendered in separate layers and the number of clipping regions L1-L3 to which the objects 240 in the group are assigned, the total number of objects 240 in the group is identified. The total number of objects 240 is then divided by the number of defined clipping regions resulting in the number of objects to assign to each clipping region. In some embodiments, approximately the same number of objects are assigned to each clipping region. For example, the animator may select three clipping regions for a group of thirty thousand objects such that ten thousand objects are assigned to each clipping region.

The position (e.g. the depth extent) of each object relative to the camera position is then determined. In one embodiment, the distance between each object and the camera position is determined along the z-axis in three-dimensional space. The position of each object may be identified based on a bounding box associated with each object. The bounding box identifies the position of each object in the frame.

A list of the objects is generated such that the objects are listed in sequence based on the distance of the object relative to the camera position (e.g., nearest to farthest). The distance from the camera position is used to determine the clipping region to which the object is assigned. For example, for three clipping regions, the list of the objects is divided into thirds such that the third of the objects that are closest to the camera position are assigned to one clipping region, the third of the objects that are farthest away from the camera position are assigned to another clipping region, and the remaining third of the objects are assigned to still another clipping region.

The location of each clipping region is defined based on a depth extent of each object relative to the camera position. An attempt is made to define each clipping region such that each object is included entirely within one render layer. However, in some embodiments, portions of an object may be assigned to different clipping regions.

In some embodiments, two clipping regions may overlap slightly such that a front clipping plane is pushed back and a rear clipping plane is moved forward. In other words, the rear clipping region renders some objects (or portions of objects) assigned to the front clipping region, and the front clipping region renders some objects (or portions of objects) assigned to the rear clipping region. The overlap ensures that every pixel in the frame is opaque and any artifacts disappear.

After the objects are assigned to a clipping region and the location of each clipping region is defined, the values for the clipping regions (e.g., dimension, location, number of objects, etc.) are stored for each frame. Thus, each frame in an animation sequence may include unique clipping regions. A render layer is then created for each clipping region to render all of the objects assigned to that clipping region. Each render layer may be rendered independently and in parallel such that processing time is reduced and memory is conserved. In some embodiments, any object not included in the render layer is deactivated while the layer is rendered to further increase processing speed and reduce memory load.

After each layer corresponding to a clipping region is rendered, the layers are composited to render the entire group of objects. The final image is then obtained using the composite of the individual render layers corresponding to the clipping regions and the other objects 210, 220, 230 in the scene 200 that were not included in the group of objects 240.

As the animation sequence progresses, the size of the group of objects may change. For example, the size of the group of objects may contract as the position of the camera moves farther away from the group or as the objects in the group move closer together. Similarly, the size of the group of objects may expand as the position of the camera moves closer to the group or as the objects in the group become more spread out. In accordance with embodiments of the invention, the number of the clipping regions does not change as the size of the group expands or contracts; only the size of the clipping regions changes.

Objects in the group may move as the animation sequence progresses. For example, an object that has been assigned to the clipping region L3 may move such that it is closer to the camera position than some objects that have been assigned to the clipping region L2. In this case, the object would be reassigned to the clipping region L2 so that it can be rendered with the other objects assigned to that clipping region. In some embodiments, since the moving object has changed clipping regions (L3 to L2), one of the objects in the clipping region L2 would be reassigned to clipping region L3 such that each clipping region includes about the same number of objects. For example, the object in the clipping region L2 that is farthest away from the camera position would be assigned to the clipping region L3.

Some objects in the group may be linked together such that movement of the linked objects may result in portions of each object moving in and out of a defined clipping region. For example, the objects in the group may correspond to individual people on a dance floor. Thus, two objects corresponding to a dancing couple would be linked together. Portions of both objects may move into an adjacent clipping region while the other object portions remain in the originally assigned clipping region, based on distance from the camera position. In this case, rendering both objects in the same clipping region may result in the linked objects being clipped. To address this issue, the portions of the linked objects that are in one clipping region are rendered with that clipping region, and the remaining portions of the linked objects that are in a different clipping region are rendered with the different clipping region. As a result, a portion of each object is rendered in a different layer, and the different layers are then composited together such that any artifacts disappear.

Figure 3:
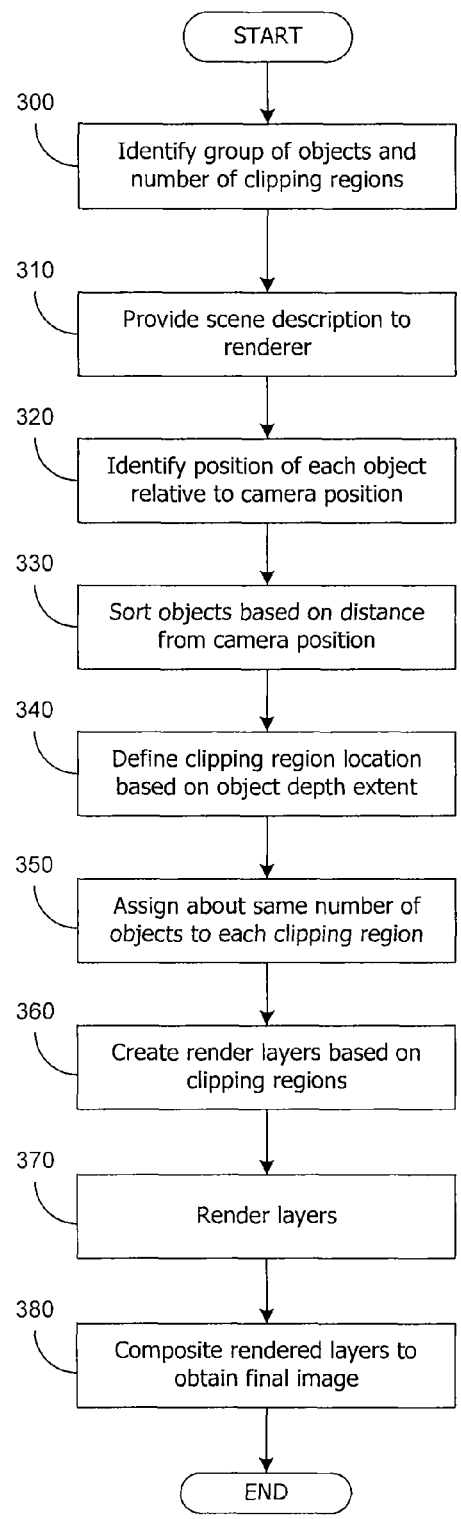
FIG. 3 is a flow diagram that illustrates a method for selectively rendering a group of objects in an animation scene by dividing the group into different layers that are rendered independently in accordance with embodiments of the present invention.

FIG. 3 is a flow diagram that illustrates a method for selectively rendering a group of objects in an animation scene by dividing the group into different layers that are rendered independently in accordance with embodiments of the present invention.

The process begins after an animator creates a frame of an animation scene that includes a collection of objects that are a part of a group. The animation scene may also include additional objects that are not a part of the group of objects. While creating the scene, the animator identifies the group of objects to be rendered separately using different clipping regions and defines the number of clipping regions to which the objects in the group are assigned (step 300). The identified group of objects and the defined number of clipping regions may be included in a description of the scene.

Before the frame is rendered, the group of objects is automatically divided into the defined number of clipping regions. The animator may select the number of clipping regions to be as few as possible such that the smallest number of layers are used to render the group of objects without running out of memory. The description of the scene including the location of each object in the group, a camera position, and the defined number of clipping regions is then provided to the renderer (step 310).

The position of each object in the group relative to a camera position is identified (step 320). In one embodiment, the distance between an object and the camera position is determined as a depth extent (e.g., along a z-axis in a three-dimensional scene).

The objects are sorted based on the position of each object relative to the camera position (step 330). A list of the objects may be generated that lists the objects in sequence based on distance from the camera position. For example, the objects are listed from nearest distance to farthest distance from the camera position.

The location of each clipping region is defined based on the depth extent of the objects (step 340). In some embodiments, the object that is positioned farthest from the camera position in each clipping region determines the location of the clipping region boundary. In some embodiments, two adjacent clipping regions may overlap.

About the same number of objects are assigned to each clipping region (step 350). For example, referring to FIG. 2, if the group is to be divided into three clipping regions (as defined by the animator), the objects in the first third of the sorted list are included in the nearest clipping region L1, the objects in the middle third of the sorted list are included in the middle clipping region L2, and the objects in the last third of the sorted list are included in the farthest clipping region L3.

Render layers are created individually based on the corresponding clipping regions (step 360). Each render layer is used to render the objects of the corresponding clipping region. Each render layer may be rendered independently and in parallel such that processing time is reduced and memory is conserved.

After each layer corresponding to a clipping region is created, the layers are rendered (step 370). The final image is then obtained by compositing the rendered layers (step 380). The layers may be composited in sequence (e.g., front to back, or back to front). The final image is the composite of the individual render layers corresponding to the clipping regions and any other rendered images of objects in the scene that were not included in the group of objects. Processing then terminates.

As can be seen from the above description, an animation scene including a group of objects is rendered by dividing the group into multiple clipping regions based on object location. The objects are sorted based on a depth extent of each object relative to a camera position. The objects are then assigned to a clipping region such that each clipping region includes about the same number of objects. Each clipping region is then rendered independently and in parallel to reduce processor and memory load.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:

1. A method for rendering an image of objects using a computing device comprising at least a processor and memory having portions of scene descriptors stored thereon, the method comprising:

receiving a description of a scene, wherein the description includes a location for each of a plurality of objects in the scene and a camera position, wherein the location and camera position are in a three-dimensional space;

determining a depth extent of each of the plurality of objects relative to the camera position, the depth extent corresponding to a distance in the three-dimensional space;

determining a number of clipping regions to be used in rendering the plurality of objects, each clipping region corresponding to a different layer to be rendered separately;

analyzing the determined depth extents to generate the clipping regions, wherein a clipping region partitions the three-dimensional space and includes a portion of the plurality of objects;

assigning objects of the plurality of objects to the clipping regions based on the depth extent of each object relative to the camera position, wherein an assigned object is assigned to one or more clipping regions; and separately rendering a layer for each clipping region, the layer being of the objects in the clipping region.

2. The method according to claim 1, wherein each object in the plurality of objects is assigned to one of the clipping regions.

3. The method according to claim 2, wherein separately rendering the layers comprises rendering the objects assigned to each clipping region in parallel.

4. The method according to claim 2, wherein assigning objects to clipping regions comprises sorting the plurality of objects into a number of groups based on the depth extent of each object, wherein objects in a same group are assigned to a same clipping region, wherein the number of groups is approximately equal to a number of the clipping regions.

5. The method according to claim 1, wherein each clipping region includes the object of the corresponding group that is located closest to the camera position, the object of the corresponding group that is located farthest from the camera position, and the remaining objects of the corresponding group located between the object that is located closest to the camera position and the object that is located farthest from the camera position.

6. The method according to claim 1, further comprising: receiving a value for a number of the clipping regions.

7. The method according to claim 1, further comprising: receiving a selection of the plurality of objects in the scene, wherein the selected plurality of objects is a subset of all of the objects in the scene.

8. The method according to claim 1, wherein the clipping regions partition the animation scene and are orderable based on depth.

9. The method according to claim 1, wherein determining a depth extent of each of the plurality of objects relative to the camera position comprises identifying a distance between each object and the camera position along a z-axis in three-dimensional space.

10. The method according to claim 1, wherein at least two of the clipping regions overlap.

11. A method for rendering an image of objects in an animation scene using a computing device comprising at least a processor and memory having portions of scene descriptors stored thereon, the method comprising:

receiving a value of a number of clipping regions associated with an animation scene, wherein a clipping region partitions a three-dimensional space, each clipping region associated with a different layer to be rendered independently;

analyzing a depth extent of each of a plurality of objects in the animation scene relative to a camera position to generate the clipping regions, wherein the plurality of objects have locations in the three-dimensional space and the camera position is located in the three-dimensional space;

assigning each of the plurality of objects to a clipping region of the clipping regions based on the depth extent of the assigned object, wherein an assigned object is assigned to one or more clipping regions; and creating a plurality of layers, each renderable independently, wherein each layer comprises the objects assigned to the layer's associated clipping region.

12. The method according to claim 11, further comprising:
receiving a description of the animation scene, wherein the description includes a location of each object in the animation scene and the camera position; and
identifying the depth extent of each of the plurality of objects relative to the camera position by identifying a distance between each object and the camera position along a z-axis in three-dimensional space.

13. The method according to claim 11, further comprising:
rendering each layer in parallel; and
compositing the rendered layers to obtain an image comprising the plurality of objects.

14. The method according to claim 11, wherein assigning objects to clipping regions comprises sorting the plurality of objects into a number of groups based on the depth extent of each object, wherein objects in a same group are assigned to a same clipping region, wherein the number of groups is approximately equal to a number of the clipping regions.

15. The method according to claim 14, wherein each clipping region includes the object of the corresponding group that is located closest to the camera position, the object of the corresponding group that is located farthest from the camera position, and the remaining objects of the corresponding group located between the object that is located closest to the camera position and the object that is located farthest from the camera position.

16. The method according to claim 11, further comprising:
receiving a selection of the plurality of objects in the scene, wherein the selected plurality of objects is a subset of all of the objects in the scene.

17. A method for rendering an image of objects in an animation scene using a computing device comprising at least a processor and memory having portions of scene descriptors stored thereon, the method comprising:
identifying a depth extent of each of a plurality of objects in an animation scene relative to a camera position, wherein the plurality of objects have locations in a three-dimensional space and the camera position is located in the three-dimensional space;
analyzing the depth extent of each of the plurality of objects in the animation scene to generate a plurality of clipping regions, wherein clipping regions partition the three-dimensional space, each clipping region corresponding to a different layer to be rendered separately;
assigning each of the plurality of objects to one or more of the plurality of clipping regions based on the identified depth extent of each of the plurality of objects; and
separately rendering a layer for each clipping region, the layer being of the objects in the clipping region.

18. The method according to claim 17, further comprising:
receiving a value for a number of the clipping regions.

19. The method according to claim 17, further comprising:
receiving a description of the animation scene, wherein the description includes a location of each object in the animation scene and the camera position.

20. The method according to claim 17, wherein separately rendering the layers comprises rendering each clipping region in parallel.

21. The method according to claim 17, further comprising:
sorting the plurality of objects into a number groups based on the depth extent of each object, wherein objects in a same group are assigned to a same clipping region, wherein the number of groups is approximately equal to a number of the clipping regions.

22. The method according to claim 21, wherein each clipping region includes the object of the corresponding group that is located closest to the camera position, the object of the corresponding group that is located farthest from the camera position, and the remaining objects of the corresponding group located between the object that is located closest to the camera position and the object that is located farthest from the camera position.

23. The method according to claim 17, further comprising:
receiving a selection of the plurality of objects in the scene, wherein the selected plurality of objects is a subset of all of the objects in the scene.

24. A non-transitory tangible storage medium storing a set of executable code modules, which when executed by a processor of a computer system, cause the processor to render an image of objects, the non-transitory tangible storage medium comprising:
code executable by the processor for receiving a description of a scene, wherein the description includes a location for each of a plurality of objects in the scene and a camera position, wherein the location and camera position are in a three-dimensional space;
code executable by the processor for determining a depth extent of each of the plurality of objects relative to the camera position, the depth extent corresponding to a distance in the three-dimensional space;
code executable by the processor for determining a number of clipping regions to be used in rendering the plurality of objects, each clipping region corresponding to a different layer to be rendered separately;
code executable by the processor for analyzing the determined depth extents to generate the clipping regions, wherein a clipping region partitions the three-dimensional space and includes a portion of the plurality of objects;
code executable by the processor for assigning objects of the plurality of objects to the clipping regions based on the depth extent of each object relative to the camera position, wherein an assigned object is assigned to one or more clipping regions; and
code executable by the processor for separately rendering a layer for each clipping region, the layer being of the objects in the clipping region.

25. The non-transitory tangible storage medium of claim 24, further comprising:
code executable by the processor for assigning each of the plurality of objects to one of the clipping regions based on the depth extent of each of the plurality of objects relative to the camera position.

* * * * *